United States Patent [19]

Walker

[11] Patent Number: 5,041,959

[45] Date of Patent: Aug. 20, 1991

[54] CONTROL SYSTEM FOR A CURRENT SOURCE CONVERTER SUPPLYING AN AC BUS

[75] Inventor: Loren H. Walker, Salem, Va.

[73] Assignee: General Electric Company, Salem, Va.

[21] Appl. No.: 567,225

[22] Filed: Aug. 14, 1990

[51] Int. Cl.⁵ .......................................... H02M 7/757
[52] U.S. Cl. ...................................... 363/79; 363/14; 363/96; 323/207; 307/46; 307/48; 307/87
[58] Field of Search ............................. 363/14, 79, 96; 323/207; 307/45, 46, 48, 85, 86, 87

[56] References Cited

U.S. PATENT DOCUMENTS 4,417,194 11/1983 Curtiss et al. ........................ 322/47
4,695,932 9/1987 Higashino ............................. 363/14

OTHER PUBLICATIONS

IEEE Article "A New PWM Control System for Ups Using Hysteresis Comparator" by Carpita et al., Conference Record of the 1987 IEEE Industry Applications Society Annual Meeting, Part I, Oct. 18–23, 1987.

Primary Examiner—William H. Beha, Jr.
Assistant Examiner—Bruce Dunn
Attorney, Agent, or Firm—Arnold E. Renner

[57] ABSTRACT

An electrical power converter including both DC and AC power terminals which are respectively connected to a DC current source and an AC voltage source, the latter comprising the grid of an AC power utility. A capacitor is coupled to the AC terminals along with a load. A control and gating circuit is coupled to the converter for supplying control signals for the thyristors of a converter bridge included in the polyphase converter. When disconnected from the utility grid, a relatively fast acting control loop is coupled to the control and gating circuit and is responsive to the current flowing in the capacitor and an AC reference voltage to accommodate the current source characteristics of the converter for maintaining an output voltage of substantially constant amplitude across the AC terminals. A second and relatively slower acting control loop is also coupled to the control and gating circuit via the fast acting control loop and is responsive to the AC voltage across the capacitor and the load for providing regulation of the voltage across the AC terminals during steady state operation.

20 Claims, 2 Drawing Sheets

CONTROL SYSTEM FOR A CURRENT SOURCE CONVERTER SUPPLYING AN AC BUS

This invention was made with Government support under Prime Contract No. DNA001-88-C-0028 (subcontract 19399-TSA-2) awarded by the Department of Defense. The Government has certain rights in this invention.

BACKGROUND OF THE INVENTION

This invention relates generally to electrical power converters and more particularly to a current source converter coupled to an AC bus for powering a load.

This invention is directed to an application including a relatively high powered current source known in the art as a Superconducting Magnetic Energy Storage System (SMES) wherein energy is stored in the magnetic field supported by current flowing in a superconducting solenoidal coil. Such a system is known to those skilled in the art and has recently been developed to energize a relatively high power laser system via a polyphase power converter which operates not only to charge the coil from an AC power source such as an electrical power utility grid, but also thereafter to convert current from the SMES coil for either feeding energy back to the utility, or powering the laser through a rectifier located between the AC terminals of the converter and the laser.

In an SMES application, current harmonics are produced by the converter and the rectifier feeding the laser. These harmonics will be small compared to the relatively high powered fundamental current if the current and the load rectifier are of a multi-pulse design. These elements can easily be multi-pulse, 24 pulse or higher, because the large rating of both the converter and rectifier make them economical to be designed as a multi-pulse system. For a twenty-four pulse rectifier or converter, the lowest harmonic in the current is the twenty third and the amplitude of this largest harmonic is typically less than 5%. Because the SMES converter is a current source, however, it cannot absorb the harmonic currents drawn by the load. Thus there must be a capacitor coupled across the utility or AC terminals of the converter to supply the load harmonics and to absorb the converter harmonics.

When the converter is operated disconnected from the utility grid for feeding the laser load, it must operate in a mode in which it controls its own voltage and frequency, independent of the load. Since an SMES converter is an AC current source and not a voltage source, it cannot regulate voltage directly. While it can regulate current into the connected load in a manner which produces a constant voltage, the controls to accomplish this function are relatively difficult to implement if the nature of the load is unknown or time variable. Thus one means for easing the design of the controller for the converter is to place a capacitor across the AC terminals of the converter. The converter controls then regulate the component of current which flows into the capacitor and hence regulate terminal voltage.

SUMMARY OF THE INVENTION

It is, therefore, an object of the present invention to provide an improvement in electrical power converters and their methods of operation.

It is a further object of the invention to provide an improvement in the control of current source converters.

It is another object of the invention to provide an improved control of a current source inverter which can operate either isolated or in parallel with AC power supplied from a utility.

It is still a further object of the invention to provide an improvement in the control of a polyphase current source thyristor converter being controlled so as to have the characteristics of an AC voltage converter.

The foregoing and other objects are achieved by a control system for an electrical power converter including both DC and AC power terminals which are respectively connected to a DC current source and an AC voltage source, the latter comprising, for example, the grid of an AC power utility. A capacitor is coupled to the AC terminals along with a load, typically including a rectifier coupled to a relatively high powered laser which acts as the load. A control and gating circuit is coupled to the converter for supplying firing and turn-off signals for the thyristors of a converter bridge included in the polyphase converter. When disconnected from the utility grid, a relatively fast acting control loop is coupled to the control and gating circuit and is responsive to the current flowing in the capacitor and an AC reference voltage to accommodate the current source characteristics of the converter for maintaining an output voltage of substantially constant amplitude across the AC terminals. A second and relatively slower acting control loop is coupled to the fast acting control loop and is responsive to the AC voltage across the capacitor and the load circuit for providing regulation of the voltage across the AC terminals during steady state operation.

BRIEF DESCRIPTION OF THE DRAWINGS

While the present invention is defined in the claims annexed to and forming a part of this specification, a better understanding can be had by reference to the following description taken in conjunction with the accompanying drawings in which:

DETAILED DESCRIPTION OF THE INVENTION

Figure 1:
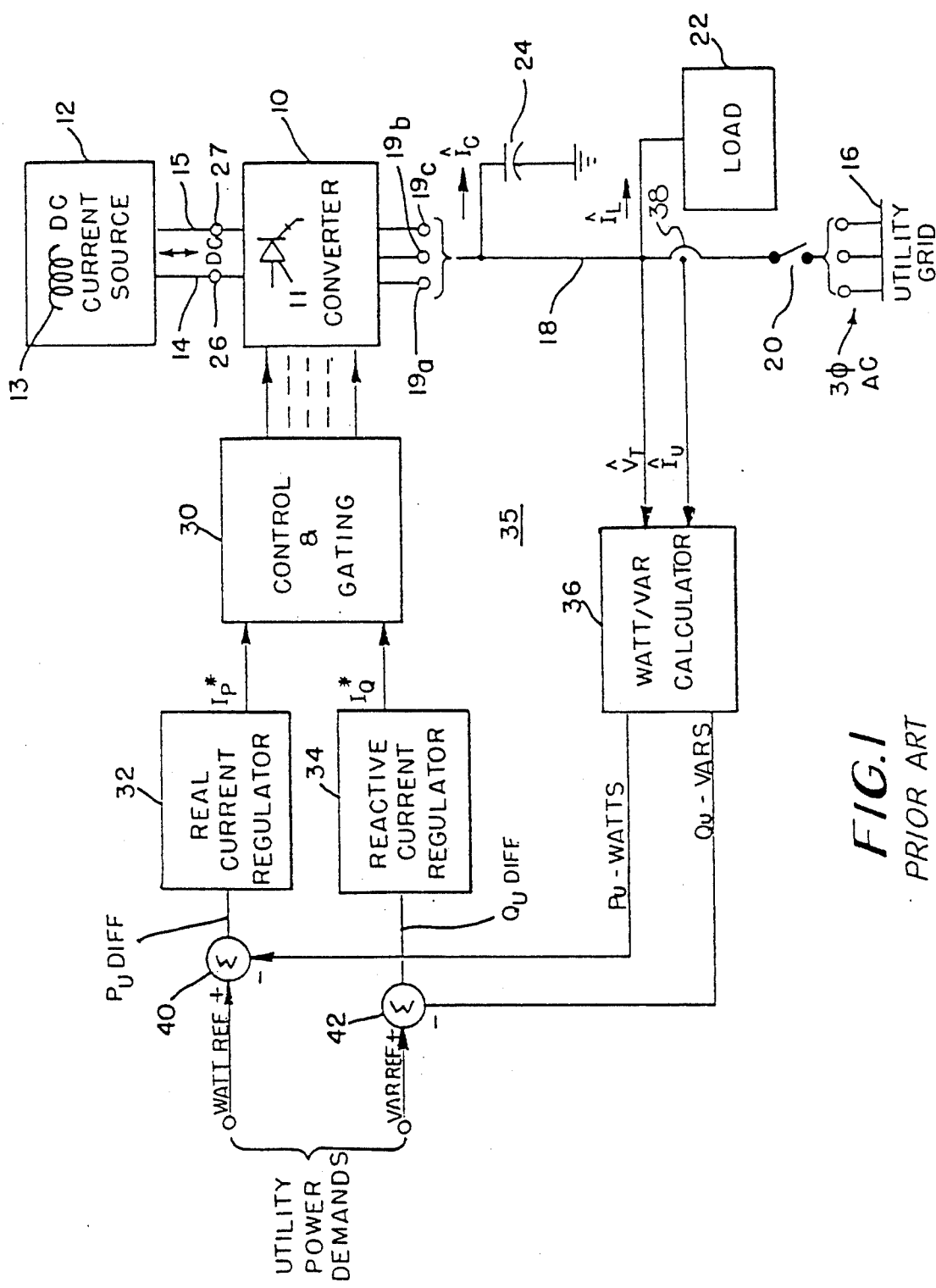
FIG. 1 is an electrical block diagram illustrative of a control for a current source converter in accordance with the known prior art.

Referring now to the drawings and more particularly to FIG. 1, disclosed thereat is a current source converter 10, including a polyphase thyristor bridge 11 designated by the depiction of a single semiconductor thyristor which operates to convert either AC to DC or DC to AC, connected on one side to a source of direct current 12 via a DC current bus including, for example, conductors 14 and 15, and on the other side to an AC source 16 shown as the portion of a power utility grid connected to a three-phase ($3\phi$) alternating current power source, not shown. The source of AC power is connected to the $3\phi$ AC terminals $19_a$, $19_b$, $19_c$ of the converter 10 through a $3\phi$ AC bus 18 and suitable disconnect switch which is denoted by reference numeral 20. A load 22 is shown connected to the AC bus 18 along with a parallel capacitor 24. In this invention, the DC current source 12 comprises, for example, the coil of a super conducting magnetic energy storage system (SMES) as shown by reference numeral 13 and the converter is used to supply AC power to the load 22 when the switch 20 is open and disconnected from the utility grid 16.

In such applications, the terminal characteristics of the converter 10 determine which type of control which will produce the desired dynamic performance. Conventional converters utilized for this type of operation have very similar terminal characteristics. On its DC terminals, indicated by reference numerals 26 and 27, the converter 10 is able to absorb the SMES coil current from the source 12. This coil current $I_{DC}$ is always larger than is required to produce the AC current $I_{AC}$ at the output terminals of the converter. If this condition did not exist, the converter 10 could not exercise full control of the real and reactive power flow inasmuch as the function of the converter 10 is to output to its AC terminals $19_a$, $19_b$, $19_c$, a portion of the coil current and to by-pass the remainder. The portion which is output is directable in phase so that the converter 10 has full control of the real and reactive current. When inductances are eliminated which prevent rapid changes in the portion of the SMES current which is passed to the AC terminals $19_a$, $19_b$, $19_c$, the transient response of the converter can be made as fast as needed for the particular application.

The difference between the current source converter 10 shown in FIG. 1, often referred to as the SMES converter, and other power generation apparatus which might be connected to the utility grid 16 is that the SMES converter 10 acts as a current source. If the load 22 demands more current, voltage sources will tend to supply this current demand without control action. The converter 10 of this invention, however, when acting as a current source converter does not inherently respond to this demand. Thus in order to operate in a utility disconnected type mode where, for example, the disconnect switch 20 is open, the converter 10 must include at least one control loop so as to implement a voltage regulator function. This must also be accomplished with rapid transient response if the AC voltage is to be maintained reasonably constant upon the sudden application or removal of loads which is typical of a load in the form of a relatively high power laser system.

In the control circuit illustrated in FIG. 1, the current source converter 10 is connected to a control and gating circuit 30 such as, for example, that described in copending U.S. patent application Ser. No. 07/567,226 titled "Power Conversion Scheme Employing Paralleled Units" by L. H. Walker (assignee's docket 21-DSV-2746) filed on even date herewith, which application is specifically incorporated herein by reference. This control has for its purpose the generation and application of pulses for controlling the conductivity of a polyphase thyristor bridge, as indicated by reference numeral 11. The gating and control circuit operates to control two components of current, real and reactive current, as shown by the command signals $I_P^*$ and $I_Q^*$ generated by a pair of current regulators 32 and 34. Each of these command signals $I_P^*$, and $I_Q^*$ can be positive or negative so that four quadrant power flow is available. A closed loop control 35 is provided which will cause the converter 10 to rapidly and linearly produce the required currents and to reach a desired operating point. The specific application determines what the form of the closed loop portion of the control will take in order to shape the converter characteristic into the desired system characteristic.

When the converter 10 is to be operated in a mode where it couples the DC source 12 and more particularly a SMES system to the utility grid 16, (the mode when switch 20 is closed) the control can ignore the load 22. Thus with the source 12 connected to the utility grid 16, the power command will be controlled in accordance with whether the coil 13 in the SMES system is being charged by the utility or power is being returned to the utility grid 16 from the SMES system coil 13 and will be charging at a rate determined by the utility available power or discharging as required by the utility. The load 22 is regarded as a part of the total load on the SMES converter 10.

In either case, a reference value of utility power (WATTS) is provided as an input signal WATT REF. The reactive power, volt amperes reactive (VAR), interchanged by the SMES system with the converter 10, can also be independently commanded by the utility through a reference input signal VAR REF. The value of VAR REF in some other energy storage converters has been previously established in a coordinated manner to cause no net voltage swing at a specific point in the utility grid. Thus if the SMES system 12 is charging and tending to depress the voltage on the utility grid 16, it can deliver a small amount of leading reactive volt amperes (VARS) to cause a voltage rise which exactly compensates the slight voltage drop due to the real power.

Once the utility power signals WATT REF and VAR REF are known, the control loop 35 as shown in FIG. 1 is implemented by a pair of current regulators 32 and 34 for real current $I_P$ and reactive current $I_Q$, respectively, and a WATT/VAR calculator 36 which determines the real power $P_U$ and reactive power $Q_U$ appearing on the AC bus 18 in response to sensed voltage and currents thereon as indicated by the signals $\hat{V}_T$ and $\hat{I}_U$. The ( $\hat{\ }$ ) is indicative of a polyphase AC signal. As shown, current $\hat{I}_U$ is sensed by a current sensor 38 coupled to the AC bus 18. The two calculator output signals $P_U$ and $Q_U$, corresponding to real power and reactive power, are applied to respective summing junctions 40 and 42 along with the signals WATT REF and VAR REF where real and reactive power difference signals $P_U$ DIFF and $Q_U$ DIFF signals are generated and fed to the real current and reactive current regulators 32 and 34. The current regulators 32 and 34, in turn, generate real and reactive current command signals $I_P^*$ and $I_Q^*$ which are fed to the gating and control circuit 30, thus forming a well known closed loop feedback control circuit. Since the capacitor 24 is connected on the converter side of the power line, the converter 10 and not the power utility grid 16 supplies the capacitor load current. Thus the control loop as shown in FIG. 1 forces the utility current $I_{AC}$ to the commanded value and causes the converter 10 to supply the capacitor current $\hat{I}_C$.

Consider now the case where the load 22 is connected at the same point on the AC bus 18 as the capacitor 24. In this instance any current $\hat{I}_L$ drawn by the load 22 will again be supplied by the converter 10 and not from the utility grid 16. Thus the utility power WATT REF and VAR REF signals can be set to any desired level and will remain there independent of the current drawn by the load 22. To operate as described, it is merely necessary that the transient response of the two current regulators 32 and 34 as shown in FIG. 1 must be faster than the rate of change of the load current $\hat{I}_L$. With such regulators, the dynamics of load application can be readily analyzed. For example, if the load 22 makes a change in current demand $\hat{I}_L$ at a known rate of change, the initial change in current will tend to be drawn from the utility grid 16. This is because the converter 10 is a current source. The control loop 35, however, will sense this change in utility power and adjust the command signals $I_P^*$ and $I_Q^*$ to restore the utility power draw to the levels commanded. During this control interval, the change in load current is transferred from the utility grid 16 to the converter 10 and the utility power is restored to its commanded value. What has been shown and described up to this point is a conventional technique well known to those skilled in the art.

This now leads to a consideration of the inventive concept of this invention which is directed to the control of the current source converter 10 and more particularly to an SMES converter when it feeds AC power to a load while disconnected from the utility grid 16 (FIG. 1).

Figure 2:
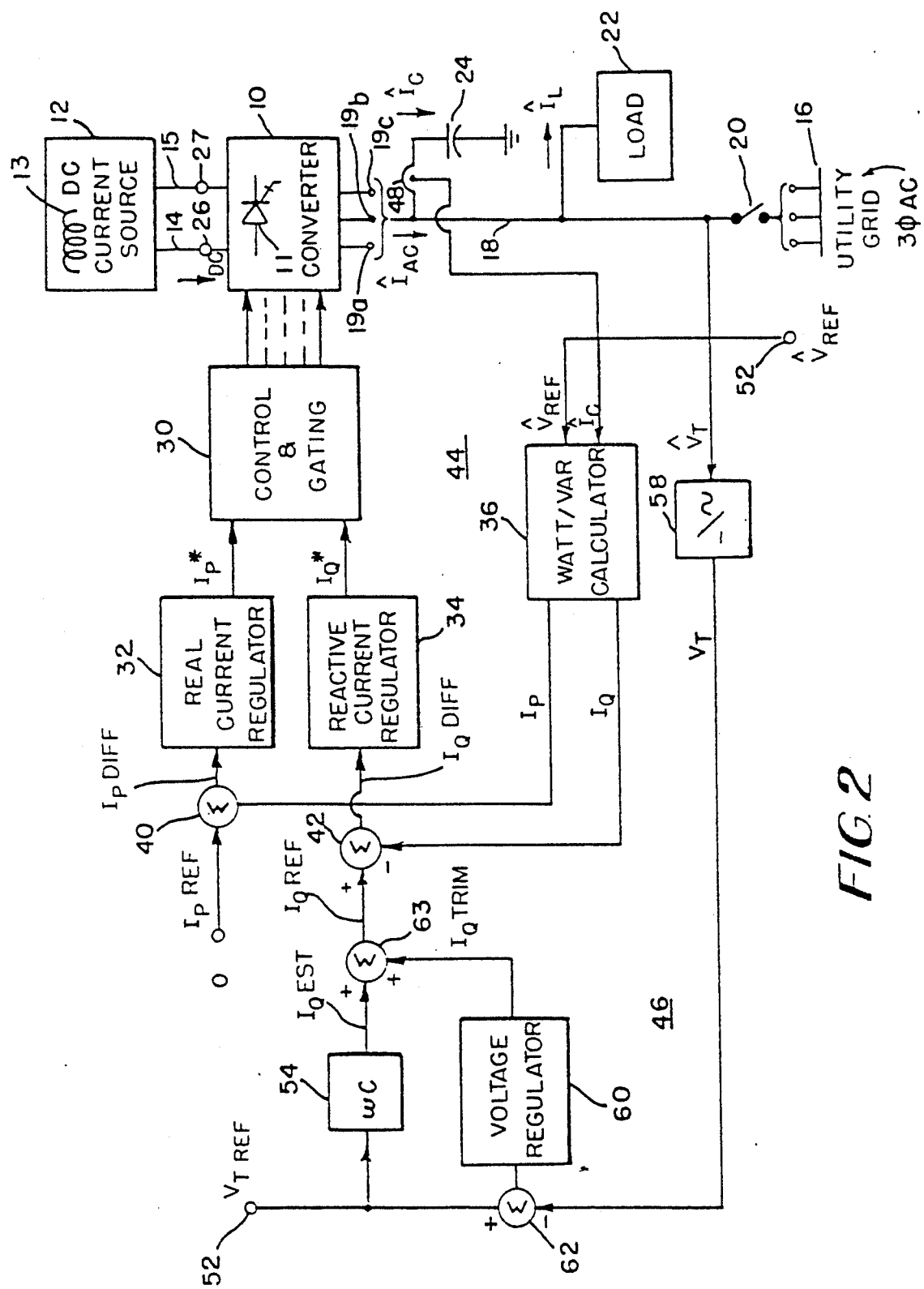
FIG. 2 is an electrical block diagram of the preferred embodiment of the invention.

Referring now to FIG. 2, two control loops are now provided. This is due to the fact that in order to operate disconnected from the power utility, i.e. the grid 16, there must be a reference for frequency, phase and voltage magnitude for the converter 10. An externally supplied signal $V_{TREF}$ applied to terminal 52 represents the desired voltage magnitude while a second externally supplied signal $\hat{V}_{REF}$ applied to terminal 50 is a polyphase sinewave signal representing the desired phase and frequency. The configuration shown in FIG. 2 includes a relatively fast acting inner control loop 44 and a relatively slower outer control loop 46, with both loops having as their objectives the maintaining of a constant voltage amplitude at the AC terminals $19_a$, $19_b$, $19_c$ of the converter 10. The fast loop 44 corresponds to the control loop 35 shown in FIG. 1 with the exception that the inputs to the WATT/VAR calculator 36 are connected to different points in order to accommodate the current source characteristics of the SMES converter 10. The slow loop 46, on the other hand, is configured to provide perfect voltage regulation for steady state operation.

Considering first the relatively faster inner loop 44, it includes not only the converter 10 and its control and gating circuit 30, but also the real and reactive current regulators 32 and 34 and the WATT/VAR calculator 36 as shown in FIG. 1. However, the current input to the calculator 36 now comprises the capacitor current $\hat{I}_C$ as sensed by the current sensor 48 coupled in series with the capacitor 24. The voltage input to the calculator 36 is now connected to an AC reference voltage $\hat{V}_{REF}$ at terminal 50 rather than the AC voltage on the bus 18. If operation synchronized with the AC line voltage of the power utility is desired, then reference voltage $\hat{V}_{REF}$ may take the form of the AC voltage of the power utility. If the utility voltage is not required, then an oscillator of any desired type, not shown, can be utilized to provide a polyphase sinewave reference of a predetermined amplitude.

The function of the fast inner loop 44 is to hold the capacitor current $\hat{I}_C$ constant. If capacitor current $\hat{I}_C$ is constant, then the AC terminal voltage across terminals $19_a$, $19_b$ and $19_c$ of the converter 10 will be constant. The reason for utilizing such a configuration is that the converter 10 responds well to errors in real and reactive current but does not respond well to voltage error signals. The command for magnitude of capacitor current is the output of a multiplier 54 which multiplies the $V_T$ REF signal by the susceptance $\omega C$ of the capacitor 24 to obtain an estimate $I_Q$ EST of the desired magnitude of the capacitor current.

As noted above, the WATT/VAR calculator 36 is responsive to inputs of the current $\hat{I}_C$ in the capacitor 24 and the reference voltage $\hat{V}_{REF}$. The voltage $\hat{V}_{REF}$ is considered a constant amplitude input and therefore can be regarded as a unit vector with information in its frequency and phase position, but having no information in its magnitude. Thus the WATT/VAR calculator 36 calculates WATTs and VARs using the actual capacitor current $\hat{I}_C$ and a desired voltage reference $\hat{V}_{REF}$ of unit amplitude. The outputs of the WATT/VAR calculator 36, however, can be regarded as the real and imaginary parts of the capacitor current. Thus the outputs of the calculator 36 are designated current signals $I_P$ and $I_Q$ and are respectively fed to the summing junctions 40 and 42. Of course, if the capacitor 24 could be considered an ideal capacitor, there would be no real part of the capacitor current, i.e. $I_P$, and if the voltage fed to the WATT/VAR calculator were the voltage across the capacitor 24, this would be true. However, since the voltage fed to the WATT/VAR calculator 36 is the desired phase and amplitude of capacitor voltage, then any error in phase position of capacitor voltage which also corresponds to AC terminal voltage across the terminals $19_a$, $19_b$ and $19_c$ shows up as a real current component $I_P$ in the output of the WATT/VAR calculator 36. Thus if the terminal voltage of the converter 10 is at the correct phase and amplitude, the capacitive current $I_Q$ will have a value set by the signal $I_Q$ EST and its real current $I_P$ will be 0. Accordingly, the command at $I_P$ REF to the summing junction 40 and applied to terminal 56 is set at zero level.

If there is a load current $\hat{I}_L$, it is not sensed by the WATT/VAR calculator 36. There is no need to sense this current if the AC terminal voltage magnitude and phase are correct, since the controls of the converter 10 are satisfied by the sensed capacitor current $\hat{I}_C$. If, however, there is a change in load current $\hat{I}_L$, this change will subtract from the capacitor current $\hat{I}_C$ because the converter 10 is a current source and is non-compliant to a load current demand. The control loop 44, on the other hand, senses this change in capacitor current $\hat{I}_C$ and moves rapidly to restore the capacitor current to its correct magnitude and phase. Thus the converter 10 picks up the load current $\hat{I}_L$. The reason for this technique being implemented is that the converter 10 will respond rapidly, linearly and stably to current demands, while it is substantially more difficult to control in response to a voltage command.

Considering now the relatively slower control loop 46, it is made up of an AC to DC converter (rectifier) 58 and voltage regulator 60 and a pair of summing junctions 62 and 63. The AC to DC converter 58 develops an output signal $V_T$ representing the magnitude of the actual AC terminal voltage on the AC bus 18. The regulator 60 is a relatively slow acting regulator which responds to the difference of the reference voltage $V_{REF}$ and the magnitude $V_T$ of the AC terminal voltage. Both of these signals are applied to the summing junction 62 which generates a difference signal that is applied to the input of the voltage regulator 60. The output of the regulator 60 comprises a signal $I_Q$ TRIM which acts as a trim or fine tuning voltage which is added to the capacitor current signal $I_Q$ EST. These signals combine to provide the current reference signal $I_Q$ REF which is applied to the summing junction 42 and from which the current difference signal $I_Q$ DIFF signal is applied to the reactive current regulator 34.

Thus the fast loop 44 follows a command for capacitive current and the magnitude of this command is slowly updated to see that the voltage is precisely correct, even if the capacitor 24 itself is not exactly the capacitance expected. Thus any sudden change in load current $\hat{I}_L$ is allowed to become a change in capacitor current $\hat{I}_C$. The converter 10 control loops 44 and 46 respond to quickly null the change in capacitor current $\hat{I}_C$ and thus force the converter 10 to pick up the change in load current $\hat{I}_L$. Satisfactory operation of the embodiment shown in FIG. 2 depends on the response time of the control loops and must be faster than the rate of change of load demand.

Accordingly, what has been shown and described is a scheme for controlling a current source converter feeding a load from a DC current source during a DC to AC mode in which the AC output voltage of the converter is regulated by controlling the AC current output of the converter in response to a current in a capacitor coupled in parallel with the load across the AC output terminals of the converter.

Having thus shown and described what is at present considered to be the preferred embodiment of the invention, it should be noted that the same has been made by way of illustration and not limitation. It is to be specifically recognized that although an analog implementation has been considered herein, which is better able to provide an understanding of the invention, digital equivalents are clearly considered to be within the scope of the invention as claimed. Accordingly, all modifications, alterations and changes coming within the spirit and scope of the invention as set forth in the appended claims are herein meant to be included.

What is claimed is:

1. A control system for a current source converter for powering a polyphase AC load and having the characteristics of an AC voltage regulator comprising:
   a) an electrical power converter including both AC terminals and DC terminals, configured to deliver power from a DC current source to an AC load;
   b) a capacitor commonly coupled in parallel with said load to said AC terminals;
   c) a control and gating circuit coupled to the converter for supplying control signals to the converter;
   d) means for furnishing a voltage magnitude reference signal;
   e) means responsive to said voltage magnitude reference signal to develop a command signal representing a reactive current magnitude command;
   f) means for furnishing a polyphase voltage reference signal;
   g) means to sense current in said capacitor and provide a current signal representative thereof;
   h) a calculator responsive to said polyphase voltage reference signal and said current signal to resolve said current signal into signals representing its real and reactive components with respect to said polyphase voltage reference signal; and
   i) a current control loop responsive to said command signal and to said signals representing said real and reactive components to maintain the real component essentially at zero value and the reactive component at a value represented by said command signal.

2. The invention in accordance with claim further including a second control loop acting relatively slower than said current control loop comprising:
   a) means to sense the voltage at said AC terminals and to provide a voltage feedback signal representative thereof;
   b) means to combine said voltage feedback signal and said voltage magnitude reference signal to yield a voltage error signal;
   c) regulator means responsive to said error signal to develop a trim signal; and
   d) means responsive to said trim signal to modify said command signal whereby the voltage at said AC terminals corresponds to the value of said voltage magnitude reference signal.

3. The invention in accordance with claim 1, wherein said AC load includes an AC voltage source, wherein said converter is capable of bilateral operation to selectively convert AC power from said AC voltage source to DC power or to convert DC power from said DC current source to AC power.

4. The invention in accordance with claim 3 further including means to selectively connect and disconnect said converter to and from said AC voltage source.

5. The control system of claim 1 wherein said converter comprises a polyphase thyristor converter.

6. The control system of claim 5 wherein said DC current source comprises a charged inductance coil.

7. The control system of claim 6 wherein said inductance coil comprises a superconducting coil having energy stored in a magnetic field supported by current flowing in said coil.

8. The control system of claim I wherein said current loop additionally includes:
   j) means for generating a first difference signal between said signal corresponding to the real current component and a signal corresponding to a real current reference signal;
   k) means for generating a second difference signal between said signal corresponding to the reactive current component and a signal corresponding to a reactive current reference signal;
   l) a first current regulator coupled to said first difference signal and generating a real current command signal which is coupled to said gating control circuit; and
   m) a second current regulator coupled to said second difference signal and generating a reactive current command signal which is also coupled to said gating control circuit.

9. The control system of claim 8 wherein said polyphase voltage reference signal represents the voltage of a polyphase AC power system.

10. The control system of claim 1 wherein said calculator (h) for generating comprises a WATT and VAR calculator.

11. The control system of claim 1 wherein said means (e) for generating a reactive current magnitude command signal comprises means to multiply said voltage magnitude reference signal by a value representing the susceptance of said capacitor.

12. The control system of claim 2 wherein said means (e) for generating a reactive current magnitude command signal comprises means to multiply said reactive current magnitude command signal by a value representing the susceptance of said capacitor.

13. A method of controlling a current source converter including both AC terminals and DC terminals for powering a polyphase AC load from a DC current source, comprising the steps of:
- a) commonly coupling a capacitor in parallel with said load to said AC terminals;
- b) coupling a control and gating circuit to the converter for supplying control signals to the converter;
- c) generating a voltage magnitude reference signal;
- d) generating a command signal representing a reactive current magnitude command in response to said voltage magnitude reference signal;
- e) generating a polyphase voltage reference signal;
- f) sensing current in said capacitor and generating a current signal representative thereof;
- g) resolving said current signal into signals representing components of real and reactive current with respect to said polyphase voltage reference signal; and,
- h) in a current control loop maintaining the real current component essentially at zero value and the reactive current component at a value represented by said command signal.

14. The method in accordance with claim 13 and further including a second control loop acting relatively slower than said current control loop, including the steps of:
- a) sensing the voltage at said AC terminals and generating a voltage feedback signal representative thereof;
- b) combining said voltage feedback signal and said voltage magnitude reference signal and generating a voltage error signal therefrom;
- c) generating a trim signal in response to said error signal; and
- d) modifying said command signal in response to said trim signal whereby the voltage at said AC terminals corresponds to the value of said voltage magnitude reference signal.

15. The method in accordance with claim 14, wherein said AC load includes an AC voltage source, and wherein said converter operates bilaterally to selectively convert AC power from said AC voltage source to DC power or to convert DC power from said DC current source to AC power.

16. The control system of claim 14 wherein said converter comprises a polyphase thyristor converter.

17. The control system of claim 14 wherein said DC current source comprises a charged inductance coil.

18. The control system of claim 17 wherein said inductance coil comprises a superconducting coil having energy stored in a magnetic field supported by current flowing in said coil.

19. The method of claim 13 wherein said step (h) additionally includes the steps of:
- i) generating a first difference signal between said signal corresponding to the real current component and a signal corresponding to a real current reference signal;
- j) generating a second difference signal between said signal corresponding to the reactive current component and a signal corresponding to a reactive current reference signal;
- k) coupling said first difference signal to a first current regulator and generating a real current command signal;
- l) coupling said real current command signal to said gating control circuit;
- m) coupling said second difference signal to a second current regulator and generating a reactive current command signal; and
- n) coupling said reactive current command signal to said gating control circuit.

20. The method of claim 13 wherein said step (d) of generating a command signal comprises multiplying said voltage magnitude reference signal by a value representing the susceptance of said capacitor.

* * * * *